Feb. 4, 1941.    F. KOPPELMANN    2,230,571
ALTERNATING-CURRENT CONTROL SYSTEM
Filed Nov. 26, 1938    2 Sheets-Sheet 1
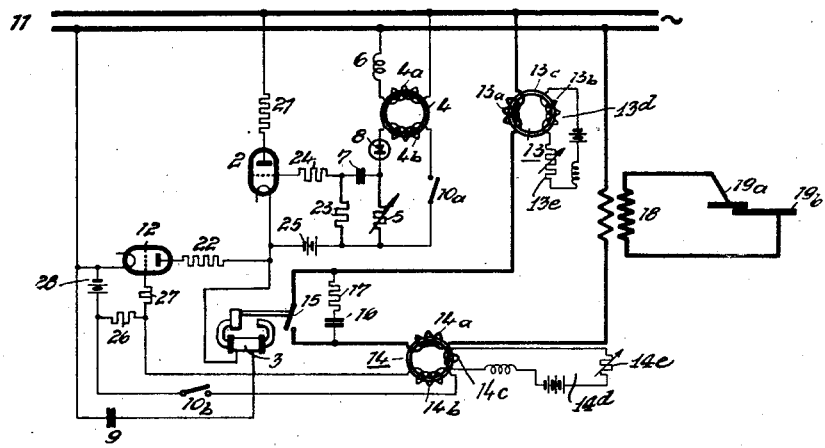
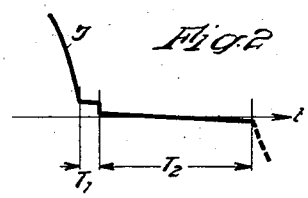

Feb. 4, 1941. F. KOPPELMANN 2,230,571
ALTERNATING-CURRENT CONTROL SYSTEM
Filed Nov. 26, 1938 2 Sheets-Sheet 2

Floris Koppelmann
Inventor
by Hughes
Atty

Patented Feb. 4, 1941

2,230,571

UNITED STATES PATENT OFFICE 2,230,571

ALTERNATING-CURRENT CONTROL SYSTEM

Floris Koppelmann, Berlin-Siemensstadt, Germany, assignor to Patentverwertungs-Gesellschaft mit beschränkter Haftung "Hermes," Berlin, Germany, a corporation of Germany Application November 26, 1938, Serial No. 242,497
In Germany March 3, 1937

22 Claims. (Cl. 175—373)

This invention relates to alternating-current control systems.

The object of the present invention is the provision of an alternating-current control system by which accurately controlled quantities of current (impulses) can be transmitted during frequently recurring short intervals. Such systems are particularly suitable for the purpose of electric spot or seam welding.

For such purposes, grid-controlled discharge devices have heretofore been employed, especially in cases where large output energies are required. Such discharge devices, however, have a relatively low efficiency owing to the voltage drop across the discharge path.

In the copending application Serial No. 114,965, filed December 9, 1936, is described an alternating-current control system in which the instantaneous value of the current and the variation of voltage across the switching gap are simultaneously influenced in order to prevent arcing during the switching operation. To this end, saturable reactors are inserted in the circuit of the make and break contacts, by means of which reactors the current characteristic is automatically distorted in such a manner that the instantaneous values of the current intensity vary only gradually in the neighborhood of the zero passages of the current characteristic so that weak current intervals are brought about during which the current characteristic is flattened and runs immediately above or below the zero line or coincides practically with the latter. Furthermore, one or more additional circuits, including preferably a capacitor, are arranged in parallel relation to the switching gap formed between the make and break contacts, through which parallel circuits the current interrupted by the make and break contacts is at least partially maintained in such a manner that after the moment when the contacts start separating the voltage drop at first prevails substantially across the impedances connected in series with the make and break contacts so that the voltage recurrent across the make and break contacts increases only gradually. Such an alternating-current control system is particularly suitable for frequently repeated switching operations, since it operates without causing practically any arcing. The system has a high efficiency, particularly when provided with lifting rather than frictional contacts, since practically no voltage drop occurs across the contacts coming into metallic contact with one another, so that no appreciable losses are caused by the contact devices of the system.

Such a system for interrupting alternating current is provided according to the invention—for the purpose of transmitting accurately controlled quantities of current (impulses) at short intervals—with a control device which, in response to a control impulse transmitted at will, effects during the flat portions of the current curve in the neighborhood of the zero value of the current an automatic switching-in in accordance with the variation of voltage and, in response to a second control impulse transmitted at will, an automatic switching-out in accordance with the variation of current. The control impulses transmitted at will thus produce a coarse control which initiates the automatic fine control of the current.

In the accompanying drawings are shown two embodiments of the invention in diagrammatic form, in which Fig. 1 shows one form of the system for interrupting alternating current;

Fig. 2 indicates a flattened portion of the current curve in the neighborhood of the zero value of the current;

Figs. 3 and 4 show curves of the current impulses transmitted by the system, for instance for welding purposes;

Figure 5:
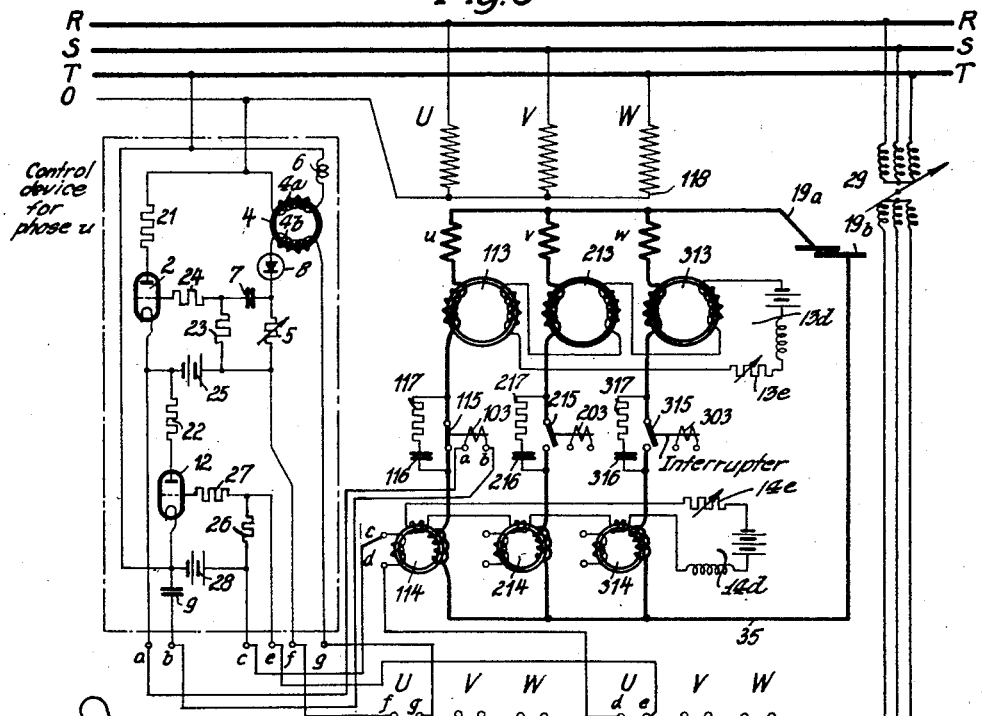
Fig. 5 shows another embodiment of the invention in connection with a three-phase current supply circuit.

In Fig. 1, 11 denotes a single-phase alternating current supply circuit to which is connected a single-phase impulse transmitting system. 15 denotes a make and break contact of a switching device or contactor. Of course, it is easily possible to obtain by multiplication a three-phase system which may be connected to a three-phase supply circuit.

In series with the make and break contact 15 of the contactor is arranged a so-called switching reactor 13 which consists of a winding 13a interlinked with ferromagnetic material, for instance with a closed iron core 13c. The core is so dimensioned relative to the energizing current that the ferromagnetic material is unsaturated at low current intensities in the neighborhood of the zero value of the current but is saturated at higher current values. As soon as at decreasing current the magnetization of the core passes into the unsaturated state, the inductive resistance of the reactor is suddenly increased and thereby the current additionally reduced. Therefore the current curve does not pass straight through the zero line as for instance in a normal sinusoidal curve, but forms a flattened, step-like distortion (Figs. 2 and 3) during whose duration a very low current intensity is maintained. The actuating means of the periodically operating switch 15 are so synchronized that the opening and closing of the switch contact fall within the weak current intervals established by the reactor 13. The switching reactor 13 is provided with a biasing winding 13b which is connected to a direct current circuit 13d containing a rheostat 13e. The biasing winding 13b serves to premagnetize the core 13c of the reactor, and the rheostat 13e allows varying the premagnetization. Such variation has the effect of lengthening or shortening the duration of the weak current interval from the beginning of this interval to the moment when the circuit is interrupted by switch 15 or from the closing moment of the switch to the end of the weak current interval, respectively. In this way, the rheostat 13 allows regulating the quantity of current flowing through the contact 15. A current path consisting of a capacitor 16 and a resistor 17 is connected in parallel to the make and break contact 15. This parallel path can be more accurately tuned by the addition of further devices such as are described in the copending patent applications Serial No. 114,965, filed December 9, 1936; Serial No. 122,232, filed January 25, 1937; and Serial No. 167,422, filed October 5, 1937, now Patent #2,188,361 of Jan. 30, 1940.

The parallel path 16, 17 serves to reduce the operating voltage in the initial period immediately following the opening moment of the interrupter contact 15 so that the voltage re-striking between the separating contacts remains sufficiently low to prevent sparking. Thus a low voltage interval is established during the circuit opening operation simultaneously with the above-mentioned weak current interval.

There is furthermore connected in the circuit of the make and break contact 15 the primary winding of a transformer 18 to the secondary winding of which is connected the welding circuit proper including the welding electrodes 19a and 19b.

The other parts shown in Fig. 1 serve to control the make and break contacts 15. It is assumed, for instance, that the contacts are actuated by a polarized electromagnetic drive which is schematically shown as indicated at 3.

The control system contains an auxiliary reactor 4, which controls the automatic switching-in through a grid-controlled discharge tube 2 in accordance with the variation of voltage. An auxiliary switching reactor 14 serves to control the switching-out through a grid-controlled discharge tube 12 in accordance with the variation of current.

The auxiliary switching reactor 4 has an iron core having properties similar to those of the core of the main switching reactor 13, a primary winding 4a, and a secondary winding 4b. The primary winding 4a is connected to the current supply circuit 11 through an inductance 6. The secondary winding 4b is connected through an auxiliary rectifier 8 and a capacitor 7 as well as through a switch 10a with a resistor 23 which is connected to the grid of the tube 2 through a resistance 24 and to the cathode of the tube through an auxiliary battery 25. A variable resistor 5 establishes a discharge path across the capacitor 7.

The anode of the discharge tube 2 is connected through a current limiting resistor 21 to one conductor of the current supply circuit 11. Another conductor extends from the cathode of the tube 2 to the electromagnetic control device 3 and thence through a capacitor 9 to the other conductor of the current supply circuit 11. The second discharge tube 12 is connected in parallel to the control device 3 and the capacitor 9, the anode of said tube 12 being connected through a current limiting resistance 22 to the junction of the cathode of the tube 2 and the electromagnetic control device 3, while the cathode of the tube 12 is connected to the second conductor of the supply circuit 11. The grid circuit of the tube 12 extends through auxiliary resistors 26 and 27 and through a battery 28 to the cathode. The switching reactor 14 has a secondary winding 14b connected in parallel to the resistor 26 through a switch 10b. The primary winding 14a of reactor 14 is connected in series with the main make and break contact 15. The iron core of reactor 14 has also properties similar to those of the core of the main reactor 13, and is provided with a biasing winding 14c energized by a direct-current circuit 14d which contains a rheostat 14e. The biasing circuit serves to premagnetize the reactor 14 to such an extent that it is desaturated earlier than the main switching reactor 13 when the current in the circuit of contact 15 decreases.

The operation of the control system is as follows:

The auxiliary switching reactor 4 is energized by a current having the same frequency as that of the current supply circuit 11. In this manner a voltage is induced in the secondary winding 4b. If the switch 10a is closed, a unidirectional current flows through the winding 4b, the direction of which is determined by the rectifier 8 which blocks the next half wave of opposite polarity. Accordingly, only each second consecutive half wave flowing through the primary winding 4a is operative while during the opposite half waves the current in winding 4a is a no-load current and of negligible small value. The current flowing through the primary winding 4a, due to the valve effect of rectifier 8, thus is virtually also unidirectional. The current in the winding 4a lags the voltage of the supply circuit 11 by about 90°, since the circuit has a substantially inductive resistance because of the additional inductance 6. The current therefore passes through zero approximately at the instant at which the voltage attains its maximum value. Furthermore, the current wave shape differs considerably from the sinusoidal form in the neighborhood of the zero passages of the current curve, since the reactor 4 in accordance with the magnetic charactistic of its core is suddenly desaturated as soon as a certain small value of the current intensity is reached, as explained above when referring to reactor 13. The variation in the field thus obtained produces a voltage impulse in the circuit of the secondary winding 4b by which impulse the capacitor 7 is charged. The current thus flowing through the resistor 23 produces therein a voltage drop which counteracts to such an extent the inverse blocking voltage supplied to the grid of the discharge tube 2 by battery 25 that the tube 2 becomes conductive. Thus at the instant at which the voltage of the supply circuit 11 attains a maximum value, a current flows through the discharge tube 2, whereby the capacitor 9 is charged and the winding 3 energized. Consequently, the switch 15 is moved to the closed position. The main current then flows through the transformer 18 whose secondary winding energizes the welding electrodes 19a and 19b.

The auxiliary switch 10a must again be opened in order to insure that the capacitor 7 is not again charged during the half wave after the next one before it has had time to discharge. The capacitor 7 is discharged through the resistor 5 which is variable so that the discharging period may be adapted to the desired sequence of the switching operations.

When closing the switch 10b, the auxiliary switching reactor 14, which becomes desaturated as the main current approaches the next zero passage, produces in the circuit of winding 14b an instantaneous flow of current, which counteracts the blocking voltage supplied to the grid of the discharge tube 12 by the battery 27. The condenser 9 is then discharged through the discharge tube 12, thus energizing the polarized relay 3 in the direction opposite to that in which it is energized during the switching-in operation so that the switch 15 is opened. This occurs at an instant when the main switching reactor 13 is desaturated, i. e. during the weak current interval when the intensity of the current in the main circuit is negligible, and follows a flat curve until it reaches the zero value. This part of the current curve is shown graphically in Fig. 2. J represents the curve of the current in the main circuit controlled by switch 15, and $t$ represents time. The current step produced by the auxiliary switching reactor 14 occurs during the time $T_1$, while $T_2$ is the weak current interval produced by the main switching reactor 13. As the reactance of the main switching reactor 13 is at the same time very great, the main portion of the voltage drop occurs in the switching reactor while the switch 15 is being opened, whereas the voltage across the switching gap is practically zero so that no sparking occurs during the interruption. After the elapse of a certain low voltage interval during which the interruption is completed, the voltage across the switching gap again increases.

The switches 10a and 10b are preferably arranged on a revolving contact carrier, for instance such as carriers 100a and 100b in Fig. 6, which will be described in a later paragraph, so that a regular switching sequence is obtained. Regardless of when the impulse is transmitted by these switches, the switch 15 always closes automatically when the voltage attains its maximum value and is opened in the neighborhood of the zero value of the current during the weak current interval so that the quantity of current flowing in the meantime is accurately defined. Fig. 3 shows such a current curve as a function of the time $t$. The switches 10a and 10b may be operated in different contact sequences so that the duration and the magnitude of the individual welding impulses can be regulated at will.

If the system is to be connected to a polyphase current circuit, the connection shown need only be correspondingly multiplied. The impulse contacts are then preferably so driven in a regular sequence in synchronism with the polyphase supply current that the current taken from the output side is a direct current as shown in Fig. 4 which indicates the current curve of a three phase system.

A control system according to the present invention is particularly suitable for being connected with the low-voltage side of a welding transformer, as the invention prevents such high losses as, for instance, must be put up with in the case of grid-controlled mercury vapor discharge devices whose voltage drop is greater than the voltage of a normal welding circuit.

Such a control system according to the invention is exemplified in Fig. 5 by a three-phase circuit arrangement, in which for the sake of clearness the auxiliary devices for controlling the contacts are shown for one phase only.

The high-voltage windings U, V, W of the transformer 118 are connected to the supply circuit RST. $u, v, w$ are the star-connected low voltage windings of the transformer. To the neutral point is connected one of the welding electrodes 19a. In series with the low-voltage windings are arranged the main switching reactors 113, 213, 313, the make and break contacts 115, 215, 315 which are alternately actuated by the electromagnetic driving devices 103, 203, 303, and the auxiliary switching reactors 114, 214, 314 which serve to control automatically the circuit-breaking operation. To each make and break contact are connected in parallel a resistor 117, 217, 317 and a capacitor 116, 216, 316 respectively. Behind the auxiliary switching reactors 114, 214, 314 the conductors of the three phases are combined to a common conductor 35 which extends to the second welding electrode 19b. The auxiliary device for controlling the contact driving device 103 for the phase $u$ comprises the same parts as the control device shown in Fig. 1 except that revolving contact devices 100a and 100b are provided instead of contacts 10a and 10b. From the output terminals $a$ and $b$ extend conductors to the corresponding terminals of the electromagnetic driving device 103. A conductor extends from the output terminal $c$ to the corresponding terminal of the auxiliary winding of the auxiliary switching reactor 114. From the second terminal $d$ of the auxiliary winding extends the circuit through the corresponding terminal of the switching device 100b then through the terminal $e$ back to the corresponding output terminal of the control device. The output terminals $f$ and $g$ of the control device are connected to the corresponding terminals of the switching device 100a.

The control devices for the contact driving devices 203 and 303 comprise exactly the same parts as the above-described control device and are connected with the auxiliary windings of the auxiliary switching reactors 214, 314 as well as with the terminals of the switching devices 100a and 100b through corresponding conductors. The connection of the control device is effected through two terminals, one of which is connected to the neutral conductor O, whereas the other terminal for the phase $u$ is connected to the conductor T. Accordingly the control devices for phases $v$ and $w$ (not illustrated) have one supply lead connected with the neutral conductor 0 and the other lead with conductors R and S respectively, so that in each phase the impulse for the switching-in operation is transmitted at the moment at which the voltage of the phase attains the maximum value and at which the voltage values of the other two phases are equal. The variable resistors 5 are to be adjusted for all three phases to the same value. The magnetic bias of the main switching reactors 113, 213, 313 and of the auxiliary switching reactors 114, 214, 314 is effected at best in series-connection from a common power source through a common regulating device.

The switching devices 100a and 100b designed as revolving contact carriers are arranged on a revolving shaft coupled with a synchronous motor 30 connected to the three-phase current supply circuit through a phase shifter 29. It is assumed that the synchronous motor has four pairs of poles.

In the position shown the make and break contact 115 is closed, whereas the make and break contacts 215 and 315 are open. The auxiliary contacts of the phase $v$ are closed by the control switch 100a and therefore the impulse for closing the make and break contacts 215 is transmitted. This occurs at the next point of intersection of the voltage curves of the phases $u$ and $v$. The contacts of the auxiliary switch 100b for the phase $u$ are at the same time closed so that the impulse for opening the make and break contacts 115 may be transmitted. The opening occurs after the closure of the make and break contacts 215 within the weak current interval brought about by the switching reactor 113 within which the current in the phase $u$ is practically zero.

When each of the three make and break contacts has thus been once closed and opened and a direct-current impulse of approximately the duration of a complete cycle has been transmitted to the welding point, the current remains interrupted during the next three cycles and commences to flow again in the fourth cycle.

Figure 6:
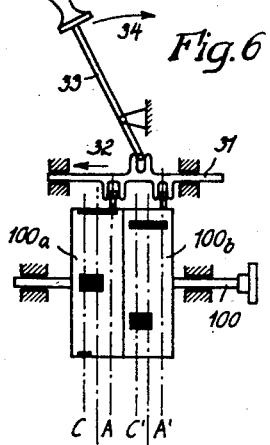
Fig. 6 is a schematical representation of the impulse control drum and of its shifting device.
Figure 5A:
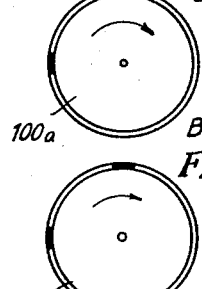
Figs. 5a to 5d show details of a regulatable impulse control drum of the system for interrupting alternating current shown in Fig. 5.
Figure 5B:
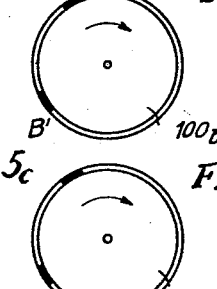
Figure 5C:
Figure 5D:

To attain current impulses of a different duration and correspondingly longer or shorter pauses, the revolving contact carriers 100a and 100b are provided as shown in Fig. 6 with three different switch positions A, B, C and A', B', C' respectively. The brushes are slidably arranged and are actuated by means of a shifter 31 associated with one arm of a two-armed lever 33 which is rotatable about a fixed axis and whose second arm is provided with a handle. If the lever is actuated in the direction as indicated by the arrow 34 the shifter 31 is displaced in the direction of the arrow 32 and the contact brushes move from the position A, A' into positions B, B' or C, C'. In the plane B the revolving contact carrier 100a is provided as shown in Fig. 5a with a second contact piece which is spaced from the first one by a double pole pitch. The revolving contact carrier 100b in the plane B' is designed in a corresponding manner as will be seen from Fig. 5b. According to Figs. 5c and 5d the revolving contact carriers 100a and 100b are provided in the third plane C, C' with a third contact piece which is also spaced from the second contact piece by a double pole pitch. In the position B, B' current impulses of the duration of two cycles are therefore transmitted, each followed by a pause of the duration of two cycles. In the position C, C' the current impulses last each time three complete cycles and the pauses a complete cycle.

The greater the number of the pairs of poles of the synchronous motor and the greater the number of the operating positions of the revolving contact carrier, the finer the regulation or the greater the regulating range will be within which the ratio of the duration of the impulse to the duration of the dead pause may be varied. A fine control may also be obtained by varying the adjustment of the rheostats 13e and 14e of the biasing circuits 13d and 14d which regulate the energy transmitted in each half wave through the switch 15, in contrast to a regulation by the control device of Fig. 6 which varies the number of half waves composing each impulse.

What is claimed is:

1. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, an impedance path connected across said contactor for reducing the operating voltage recurring between the separating contacts of said contactor, in combination with a control device for actuating said contactor, said control device having means for effecting the switching-in of said contactor in response to the variation of the voltage of said supply circuit and the switching-out of said contactor in response to the variation of said current during the flattened portion of said curve, and control contacts for transmitting control impulses to said means in order to cause said means to operate said device so as to transmit current impulses of desired length to said output circuit.

2. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, said reactor having a magnet core designed to be saturated during the greater portion of the current half wave and unsaturated at low current intensities near the zero passage of said half wave, an impedance path connected across said contactor for reducing the operating voltage recurring between the separating contacts of said contactor, in combination with a control device for actuating said contactor, said control device having means for effecting the switching-in of said contactor in response to the variation of the voltage of said supply circuit, means for effecting the switching-out of said contactor in response to the variation of said current during the flattened portion of said curve, an impulse transmitter for operating said first means, and a second impulse transmitter for operating said second means, said two transmitters being connected with each other so as to operate in a given sequence, whereby said control device causes said contactor to transmit a current impulse of desired length to said output circuit.

3. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, said reactor having a magnet core designed to be saturated during the greater portion of the current half wave and unsaturated at low current intensities near the zero passage of said half wave, a biasing winding on said magnet core and an energizing circuit connected with said winding for premagnetizing said core, an impedance path connected across said contactor for reducing the operating voltage recurring between the separating contacts of said contactor, in combination with a control device for actuating said contactor, said control device having means for effecting the switching-in of said contactor in response to the variation of the voltage of said supply circuit and the switching-out of said contactor in response to the variation of said current during the flattened portion of said curve, and control contacts for transmitting control impulses to said means in order to cause said means to operate said device so as to transmit current impulses of desired length to said output circuit.

4. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, said reactor having a magnet core designed to be saturated during the greater portion of the current half wave and unsaturated at low current intensities near the zero passage of said half wave, a premagnetizing winding on said magnet core and a biasing circuit connected with said winding, said biasing circuit containing regulating means for varying the effective length of the flattened portions of said current curve to control the quantity of current transmitted during each half wave of said curve, an impedance path connected across said contactor for reducing the operating voltage recurring between the separating contacts of said contactor, in combination with a control device for actuating said contactor, said control device having means for effecting the switching-in of said contactor in response to the variation of the voltage of said supply circuit, means for effecting the switching-out of said contactor in response to the variation of said current during the flattened portion of said curve, an impulse transmitter for operating said first means, and a second impulse transmitter for operating said second means, said two transmitters being connected with each other so as to operate in a given sequence, whereby said control device causes said contactor to transmit a current impulse of desired length to said output circuit.

5. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, an impedance path connected across said contactor for reducing the operating voltage recurring between the separating contacts of said contactor, in combination with a control system for actuating said contactor so as to transmit current impulses of desired length to said output circuit, said control system comprising means for effecting the switching-in of said contactor in response to the voltage variation in said supply circuit and the switching-out of said contactor in response to the variation of said current during the flattened portion of said curve, said means including an auxiliary saturable reactor in voltage-responsive connection with said supply circuit and another auxiliary saturable reactor in current-responsive connection with said output circuit, an impulse transmitter for operating said first means, and a second impulse transmitter for operating said second means, said two transmitters being connected with each other so as to operate in a given sequence.

6. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, an impedance path connected across said contactor for reducing the operating voltage recurring between the separating contacts of said contactor, and a control system for actuating said contactor so as to effect the switching-in in response to a control impulse and the switching-out in response to another control impulse, said system comprising an auxiliary saturable reactor connected with said supply circuit for producing said first control impulse in response to the voltage variation in said supply circuit, a second auxiliary saturable reactor connected with said output circuit for producing said second control impulse in accordance with the variation of the current flowing through said contactor, and electromagnetic drive for operating said contactor, and grid-controlled discharge means interposed between said auxiliary reactors and said drive so as to energize said drive in response to said control impulses.

7. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, an impedance path connected across said contactor for reducing the operating voltage recurring between the separating contacts of said contactor, and a control system for actuating said contactor so as to effect the switching-in in response to a control impulse and the switching-out in response to another control impulse, said system comprising an auxiliary saturable reactor connected with said supply circuit for producing said first control impulse in response to the voltage variation in said supply circuit, a second auxiliary saturable reactor connected with said output circuit for producing said second control impulse in accordance with the variation of the current flowing through said contactor, premagnetizing means associated with said second auxiliary reactor for biasing said latter reactor so as to be desaturated sooner than the aforesaid switching reactor, and electromagnetic drive means connected with said auxiliary reactors for operating said contactor.

8. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, an impedance path connected across said contactor for reducing the operating voltage recurring between the separating contacts of said contactor, in combination with a control device for actuating said contactor, said control device having means for effecting the switching-in of said contactor in response to the variation of the voltage of said supply circuit and the switching-out of said contactor in response to the variation of said current during the flattened portion of said curve, a contact device for transmitting control impulses to said means in order to cause said means to operate said control device so as to transmit current impulses of limited length to said output circuit, and drive means connected with said supply circuit for actuating said contact device in a given phase relation to the voltage cycle of the alternating current to be switched by said contactor.

9. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, an impedance path connected across said contactor for reducing the operating voltage recurring between the separating contacts of said contactor, in combination with a control device for actuating said contactor, said control device having means for effecting the switching-in of said contactor in response to the variation of the voltage of said supply circuit, means for effecting the switching-out of said contactor in response to the variation of said current during the flattened portion of said curve, an impulse transmitter for operating said first means, and a second impulse transmitter for operating said second means, and drive means associated with said two transmitters and connected with said supply circuit so as to operate said transmitters in a given sequence and in such relation to the voltage cycle of the alternating current to be switched by said contactor that the current transmitted through said contactor to said output circuit is a direct current.

10. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, an impedance path connected across said contactor for reducing the operating voltage recurring between the separating contacts of said contactor, and a control system for actuating said contactor so as to effect the switching-in in response to a control impulse and the switching-out in response to another control impulse, said system comprising an auxiliary saturable reactor connected with said supply circuit for producing said first control impulse in response to the voltage variation in said supply circuit, a second auxiliary saturable reactor connected with said output circuit for producing said second control impulse in accordance with the variation of the current flowing through said contactor, an electromagnetic drive connected with said auxiliary reactor for operating said contactor, a contact device interposed between said drive and said first auxiliary reactor, a second contact device associated with said first contact device and interposed between said drive and said second auxiliary reactor, and common actuating means for said two contact devices connected with said supply circuit in order to operate in a given phase relation to the voltage cycle of the alternating current to be switched by said contactor.

11. An arrangement for transmitting current impulses from an alternating-current supply circuit to an operating output circuit, comprising a contactor having make and break contacts interposed between said supply circuit and said output circuit and an electromagnetic drive for operating said contacts, a saturable switching reactor series connected with said contactor for flattening the curve of the current to be transmitted at low intensities near the zero value of said current, an impedance path connected across said contactor for reducing the operating voltage recurring between the separating contacts of said contactor, and a control system for actuating said contactor so as to effect the switching-in in response to a control impulse and the switching-out in response to another control impulse, said system comprising an auxiliary saturable reactor connected with said supply circuit for producing said first control impulse in response to the voltage variation in said supply circuit, a second auxiliary saturable reactor connected with said output circuit for producing said second control impulse in accordance with the variation of the current flowing through said contactor, a discharge tube having its plate circuit connected with said drive and its grid circuit connected with said first auxiliary reactor, a second discharge tube having its plate circuit connected with said drive and its grid circuit connected with said second auxiliary reactor, and a synchronous contact device connected with said supply circuit, said contact device having contact means connected with one of said grid circuits and other contact means connected with said other grid circuit, said two contact means being phase-displaced with respect to each other.

12. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, an impedance path connected across said contactor for reducing the operating voltage recurring between the separating contacts of said contactor, a control device for actuating said contactor, said control device having means for effecting the switching-in of said contactor in response to the variation of the voltage of said supply circuit and the switching out of said contactor in response to the variation of said current during the flattened portion of said curve, in combination with a selective contact device for setting said means in and out of operation in order to cause said contactor to transmit current impulses of selective length to said output circuit, said selective contact device having a drive connected with said supply circuit for operating said contact device in synchronism with said alternating current, a set of different contact makers each being designated for operating said means during a different number of consecutive cycles of said alternating current, and a mechanism for selectively changing from one to another of said contact makers.

13. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, said reactor having a magnet core designed to be saturated during the greater portion of the current half wave and unsaturated at low current intensities near the zero passage of said half wave, elements for effecting a fine regulation of the current to be transmitted, said elements consisting of a premagnetizing winding on said magnet core and a biasing circuit connected with said winding, and containing regulating means for varying the effective lenigth of the flattened portion of said current curve to control the quantity of current transmitted during each half wave of said curve, in combination with a control device for actuating said contactor, said control device having means for effecting the switching-in of said contactor in response to the variation of the voltage of said supply circiut and the switching-out of said contactor in response to the variation of said current during the flattened portion of said curve, in further combination with elements for effecting a coarse regulation of the current to be transmitted, said latter elements comprising a selective contact device for setting said means in and out of operation in order to cause said contactor to transmit current impulses of selective length to said output circuit, said selective contact device having a drive connected with said supply circuit for operating said contact device in synchronism with said alternating current, a set of different contact makers each being designed for operating said means during a different number of consecutive cycles of said alternating current, and a mechanism for selectively changing from one to another of said contact makers.

14. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, an impedance path connected across said contactor for reducing the operating voltage recurring between the separating contacts of said contactor, a control device for actuating said contactor, said control device having means for effecting the switching-in of said contactor in response to the variation of the voltage of said supply circuit and the switching-out of said contactor in response to the variation of said current during the flattened portion of said curve, in combination with a selective contact device for setting said means in and out of operation in order to cause said contactor to transmit current impulses of selective length to said output circuit, said selective contact device having a synchronous motor connected with said supply circuit, a set of different contact drums connected with said motor, each of the drums of said set having a different number of contact segments so as to operate said means during a different number of cycles of said alternating currents, and a shifting mechanism for selectively setting one of the drums of said set in operation.

15. An arrangement for transmitting current impulses from an alternating-current supply circuit to an operating output circuit, comprising a contactor having make and break contacts interposed between said supply circuit and said output circuit, a saturable switching reactor series connected with said contactor for flattening the curve of the current to be transmitted at low intensities near the zero value of said current, a regulatable direct current circuit associated with said reactor so as to premagnetize said reactor in order to effect a fine control of the impulses transmitted through said contactor, a control device for actuating said contactor, said control device having means for effecting the switching-in of said contactor in response to the variation of the voltage of said supply circuit and the switching out of said contactor in response to the variation of said current during the flattened portion of said curve, in combination with elements for effecting a coarse control of the impulses transmitted through said contactor, said elements comprising a contact mechanism for operating said means during a selective number of cycles of said alternating current.

16. In an arrangement for transmitting energy between an alternating-current supply circuit and a circuit of different current characteristic, in combination a contactor having make and break contacts interposed between said supply circuit and said output circuit, a saturable switching reactor series connected with said contactor for flattening the curve of the current to be transmitted at low intensities near the zero value of said current, means for premagnetizing said reactor so as to thereby control said flattened curve portions relative to the operation of said contactor, and a control system for actuating said contactor so as to effect the switching-in in response to a control impulse and the switching-out in response to another control impulse, said system comprising an auxiliary saturable reactor connected with said supply circuit for producing said first control impulse in response to the voltage variation in said supply circuit, a second auxiliary saturable reactor connected with said output circuit for producing said second control impulse in accordance with the variation of the current flowing through said contactor.

17. In an arrangement for transmitting energy between an alternating-current supply circuit and a circuit of different current characteristic, in combination a contactor having make and break contacts interposed between said supply circuit and said output circuit, a saturable switching reactor series connected with said contactor for flattening the curve of the current to be transmitted at low intensities near the zero value of said current, said reactor having a magnet core designed to be saturated during the greater portion of the current half wave and unsaturated at low current intensities near the zero passage of said half wave, a biasing winding on said magnet core and a regulatable direct current circuit connected with said winding for premagnetizing said core so as to control said flattened curve portions relative to the operation of said contactor, an impedance path connected across said contactor for reducing the operating voltage recurring between the separating contacts of said contactor, and a control system for actuating said contactor so as to effect the switching-in in response to a control impulse and the switching-out in response to another control impulse, said system comprising an auxiliary saturable reactor connected with said supply circuit for producing said first control impulse in response to the voltage variation in said supply circuit, a second auxiliary saturable reactor connected with said output circuit for producing said second control impulse in accordance with the variation of the current flowing through said contactor.

18. In an arrangement for transmitting energy between an alternating-current supply circuit and a circuit of different current characteristic, in combination a contactor having make and break contacts series arranged in each connecting phase between said two circuits, means for periodically biasing the current to be interrupted by said contactor so as to reduce sparking between said contacts, and a control system for actuating said contactor so as to effect the switching-in in response to a control impulse and the switching-out in response to another control impulse, said system comprising an auxiliary saturable reactor connected with said supply circuit for producing said first control impulse in response to the voltage variation in said supply circuit, a second auxiliary saturable reactor connected with said output circuit for producing said second control impulse in accordance with the variation of the current flowing through said contactor.

19. In a system for supplying welding electrodes with current from an alternating-current supply circuit, a step-down transformer having a primary to be connected with said supply circuit and a low voltage secondary for producing the welding current, a contactor having make and break contacts series connected between said secondary and said electrodes, reactance means for periodically biasing the current to be interrupted by said contactor so as to flatten the current curve near its zero passages, means for periodically reducing the operating voltage recurring between the separating contacts of said contactor, a control device for actuating said contactor, said control device having voltage-responsive means for effecting the switching-in of said contactor in response to the variation of the voltage of said supply circuit and current-responsive means for effecting the switching-out of said contactor in response to the variation of said current during the flattened portion of said curve, and control contacts for setting said latter means in and out of operation, whereby said control device is caused to actuate said contactor so as to transmit impulse of welding current to said electrodes.

20. An arrangement for transmitting current impulses from an alternating-current supply circuit to an operating output circuit, comprising in combination contact means having make and break contacts interposed between said supply circuit and said output circuit, a control system operatively connected with said contact means and having voltage-responsive means coupled with one of said circuits for effecting the closing of said contact means substantially at the maximum value of the voltage across said contacts and current-responsive means coupled with one of said circuits for effecting the opening of said contacts substantially at the zero intensity of the current flowing through said contacts, and impulse-transmitting means for setting said control system in and out of operation so as to limit the transfer of current between said circuits to a desired number of cycles of said alternating current.

21. An arrangement for transmitting current impulse from an alternating-current supply circuit to an operating output circuit, comprising in combination contact means having make and break contacts interposed between said supply circuit and said output circuit and an electric drive for operating said contacts, a control system operatively connected with said contact means for effecting the closing of said contact means in response to a control impulse substantially at the maximum value of the voltage across said contacts and the opening of said contacts in response to another control impulse substantially at the zero intensity of the current flowing through said contacts, said control system comprising an auxiliary saturable reactor connected with said supply circuit for producing said first control impulse in response to the voltage variation in said supply circuit, a second auxiliary saturable reactor connected with said output circuit for producing said second control impulse in accordance with the variation of the current flowing through said contactor, a discharge tube having its plate circuit connected with said drive and its grid circuit connected with said first auxiliary reactor, a second discharge tube having its plate circuit connected with said drive and its grid circuit connected with said second auxiliary reactor, and a synchronous contact device connected with said supply circuit, said contact device having contact means connected with one of said grid circuits and other contact means connected with said other grid circuits, said two contact means being phase-displaced with respect to each other.

22. An arrangement for transmitting current impulses from an alternating-current supply circuit to an operating output circuit, comprising in combination contact means having make and break contacts interposed between said supply circuit and said output circuit, an actuating system operatively connected with said contact means and having control means electrically coupled with and responsive to a current magnitude in said output circuit to actuate said contact means in dependence upon said magnitude reaching the zero value whereby the instant of the actuation of said contact means is automatically varied in accordance with timely deviations of said zero value from normalcy, and impulse-transmitting means for setting said control means in and out of operation so as to limit the transfer of current between said circuits to a desired number of cycles of said alternating current.

FLORIS KOPPELMANN.